US012688574B2

(12) United States Patent
Park et al.

(10) Patent No.: US 12,688,574 B2
(45) Date of Patent: Jul. 21, 2026

(54) MULTIMODE DEFECT DETECTION

(71) Applicant: KLA Corporation, Milpitas, CA (US)

(72) Inventors: Sangbong Park, Union City, CA (US);
Ge Cong, Pleasanton, CA (US);
Eugene Shifrin, Sunnyvale, CA (US);
Richard Wallingford, Ames, IA (US)

(73) Assignee: KLA Corporation, Milpitas, CA (US)

( * ) Notice: Subject to any disclaimer, the term of this patent is extended or adjusted under 35 U.S.C. 154(b) by 422 days.

(21) Appl. No.: 18/342,609

(22) Filed: Jun. 27, 2023

(65) Prior Publication Data

US 2024/0161272 A1     May 16, 2024

Related U.S. Application Data

(60) Provisional application No. 63/424,467, filed on Nov. 10, 2022.

(51) Int. Cl.
    *G06T 7/00*        (2017.01)
    *G06T 5/50*        (2006.01)
(52) U.S. Cl.
    CPC ............... *G06T 7/001* (2013.01); *G06T 5/50* (2013.01); *G06T 2207/20081* (2013.01); *G06T 2207/20224* (2013.01); *G06T 2207/30148* (2013.01); *G06T 2207/30168* (2013.01)
(58) Field of Classification Search
    CPC . G06T 2207/30148; G06T 2207/30168; G06T 5/50; G06T 2207/20224; G06T 7/001; G06T 2207/20081; G06T 7/0002
    See application file for complete search history.

(56) References Cited

U.S. PATENT DOCUMENTS

| | | | |
|---|---|---|---|
| 7,570,796 B2 | 8/2009 | Zafar et al. |
| 7,676,077 B2 | 3/2010 | Kulkarni et al. |
| 8,126,255 B2 | 2/2012 | Bhaskar et al. |
| 8,664,594 B1 | 3/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |
| 9,222,895 B2 | 12/2015 | Duffy et al. |
| 9,816,939 B2 | 11/2017 | Duffy et al. |

(Continued)

FOREIGN PATENT DOCUMENTS

| | | |
|---|---|---|
| JP | 2021-143840 | 9/2021 |

OTHER PUBLICATIONS

International Search Report and Written Opinion for PCT/US2023/036973 mailed Feb. 29, 2024.

(Continued)

*Primary Examiner* — Matthew C Bella
*Assistant Examiner* — Janice E. Vaz
(74) *Attorney, Agent, or Firm* — Entropy Matters LLC

(57) ABSTRACT

Methods and systems for detecting defects on a specimen are provided. One method includes generating first and second mode test, reference, and difference images of a specimen for first and second modes of an inspection subsystem, respectively. The method also includes combining the first and second mode test images, the first and second mode reference images, and the first and second mode difference images as an input for defect detection. In addition, the method includes detecting defects on the specimen based on at least the first and second mode difference images.

19 Claims, 4 Drawing Sheets

(56)　　　　　　　References Cited

U.S. PATENT DOCUMENTS

| | | | |
|---|---|---|---|
| 9,830,421 B2 | 11/2017 | Bhattacharyya et al. | |
| 10,186,026 B2 | 1/2019 | Karsenti et al. | |
| 10,599,951 B2 | 3/2020 | Bhaskar et al. | |
| 10,607,119 B2 | 3/2020 | He et al. | |
| 10,698,325 B2 | 6/2020 | Brauer | |
| 10,713,769 B2 | 7/2020 | Zhang et al. | |
| 10,923,317 B2 | 2/2021 | Huang et al. | |
| 11,551,348 B2 | 1/2023 | Zhang et al. | |
| 11,580,650 B2 | 2/2023 | Brauer et al. | |
| 2008/0049219 A1* | 2/2008 | Kim ................. | G01N 21/95607 |
| | | | 356/237.4 |
| 2016/0061745 A1* | 3/2016 | Chen ............... | G01N 21/95607 |
| | | | 356/237.5 |
| 2017/0193680 A1* | 7/2017 | Zhang ................... | G06V 10/82 |
| 2018/0052118 A1* | 2/2018 | Duffy ..................... | H01J 37/26 |
| 2020/0327654 A1* | 10/2020 | Zhang ..................... | G06N 3/09 |
| 2021/0090229 A1 | 3/2021 | Brauer et al. | |
| 2021/0159127 A1* | 5/2021 | Huang ................ | G06F 18/2321 |
| 2023/0314336 A1 | 10/2023 | Virk et al. | |

OTHER PUBLICATIONS

U.S. Appl. No. 18/128,125 by Virk et al., filed Mar. 29, 2023 (submitted as U.S. Patent Application Publication No. 2023/0314336 published Oct. 5, 2023).

* cited by examiner

MULTIMODE DEFECT DETECTION

BACKGROUND OF THE INVENTION

1. Field of the Invention

The present invention generally relates to methods and systems for detecting defects on a specimen with multiple modes of an inspection subsystem.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Many inspection tools have adjustable parameters for many of the output (e.g., image) generation elements of the tools. The parameters for one or more elements (such as energy source(s), polarizer(s), lens(es), detector(s), and the like) may be altered depending on the type of specimen being inspected and the characteristics of the defects of interest (DOIs) on the specimen. For example, different types of specimens may have dramatically different characteristics, which can cause the same tool with the same parameters to image the specimens in extremely different ways. In addition, since different types of DOIs can have dramatically different characteristics, inspection system parameters that are suitable for detection of one type of DOI may not be suitable for detection of another type of DOI. Furthermore, different types of specimens can have different noise sources, which can interfere with detection of DOIs on the specimens in different ways.

The development of inspection tools with adjustable parameters has also led to the increasing use of inspection processes that involve scanning the specimen with more than one combination of parameter values (otherwise referred to as "modes") for a number of reasons such as detecting more defects, detecting different defect types with different modes, nuisance filtering, etc. For example, multimode defect detection utilizes scans from multiple modes to improve detection performance. The information gained from two or more modes provides independent information to allow a detection algorithm to reinforce weakly detected defects and/or suppress or separate unwanted nuisance anomalies.

Existing multimode approaches may detect defects on a specimen with a single mode scan and then revisit and collect information for the resulting defects using a different mode. These approaches may then apply rules to the attributes from the two scans to determine whether a defect is retained or filtered out. Another less sophisticated method uses the results of two independent detection scans performed with different modes to apply the rules to the attributes of common defects to filter or retain them. Such methods may be commonly referred to as "Results Fusion."

Such currently used multimode inspection methods and systems have a number of important disadvantages. For example, such methods typically use a substantially hot scan that detects extremely large number of defects at the primary mode, followed by the second mode where additional defect attributes are collected at defect locations detected at the primary mode. Such methods may also utilize rule-based filters on the defect attributes rather than the images themselves. Such rule-based filtering can result in sub-par performance when one of the mode's defect attributes are not well-behaved. Such methods may also have poor detectability since the primary optical mode may detect a limited number of target defects. In the case of Results Fusion, the non-common defects are not processed resulting in no multimode benefit for these defects. Also, when multiple modes are practically considered, the flow should be cost effective in terms of throughput, storage, and data I/O rate.

Accordingly, it would be advantageous to develop systems and methods for detecting defects on a specimen that do not have one or more of the disadvantages described above.

SUMMARY OF THE INVENTION

The following description of various embodiments is not to be construed in any way as limiting the subject matter of the appended claims.

One embodiment relates to a system configured for detecting defects on a specimen. The system includes an inspection subsystem configured for generating first and second mode test images of a specimen with first and second modes, respectively, of the inspection subsystem. The system also includes a computer system configured for generating first and second mode reference images from the first and second mode test images, respectively. The computer system is also configured for subtracting the first and second mode reference images from the first and second mode test images, respectively, to thereby generate first and second mode difference images, respectively. In addition, the computer system is configured for combining the first and second mode test images, the first and second mode reference images, and the first and second mode difference images as an input for defect detection. The system is further configured for detecting defects on the specimen based on at least the first and second mode difference images in the input. The system may be further configured as described herein.

Another embodiment relates to a method for detecting defects on a specimen. The method includes acquiring first and second mode test images of a specimen generated with first and second modes, respectively, of an inspection subsystem. The method also includes the generating first and second mode reference images, subtracting, combining, and detecting steps described above, which are performed by a computer system. Each of the steps of the method described above may be further performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
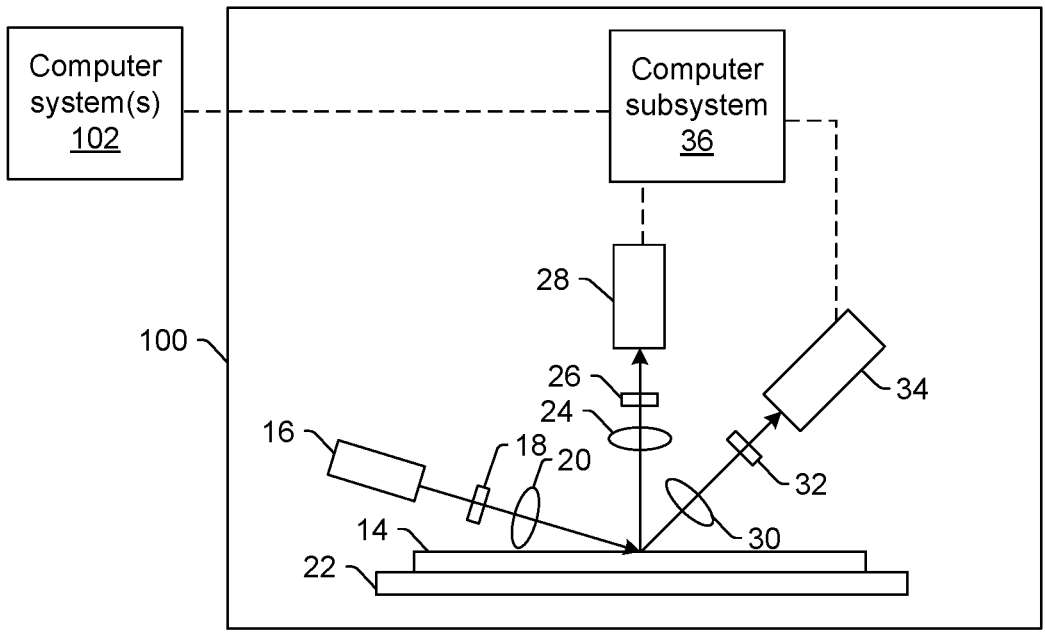
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

The terms "first" and "second" are used herein to merely indicate two things that are different from each other and are not used to indicate any temporal, spatial, preferential, or other characteristics of the elements referred to herein as "first" and "second."

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for detecting defects on a specimen with images generated by multiple modes of an inspection subsystem. In this manner, the embodiments are configured for multimode inspection of specimens. The embodiments described herein are particularly advantageous for multimode inspection applications such as optical wafer inspection but may be configured for any other type of inspection described herein.

As DOI size becomes smaller, DOI signal becomes more sensitive to the inspection tool mode. Some DOI signal is not salient enough to be detected with one mode but may be strongly detected with another mode. Typically, different inspection tool modes generate different nuisance signatures. If multiple mode information is properly utilized, it is possible to detect more DOIs while suppressing nuisances.

Existing multimode detection approaches have a number of weaknesses including those described further above. In addition, one potential weakness of most existing multimode detection approaches is that they are based on the assumption that 1) all of the DOIs are detected with significant numbers of nuisances with the primary mode and 2) there exists a second mode that can be used to determine some attributes that can be used to retain all or majority of DOIs but significantly suppresses the nuisances. The issue is that in many cases, it can be substantially challenging to find two modes that meet the assumption.

DOIs and nuisances can be common or unique to inspection tool modes. In order to suppress nuisances while detecting DOIs, it is imperative to utilize two mode information effectively at the detection level. The question then is how to effectively prepare and use a multimode data set. The embodiments described herein address this question in at least two ways. One way is to minimize throughput or system cost impact by reducing system overhead while multiple mode data is collected. The second way is to utilize multimode data directly at detection.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment relates to a system configured for detecting defects on a specimen. One embodiment of such a system is shown in FIG. 1. The system includes inspection subsystem 100 configured for generating first and second mode test images of a specimen with first and second modes, respectively, of the inspection subsystem. The inspection subsystem is coupled to one or more computer systems 102. In general, however, the system includes a computer system, which may include any configuration of any of the computer subsystem(s) or system(s) described herein.

In some embodiments, the inspection subsystem is configured for generating the first and second mode test images using light. In the embodiment shown in FIG. 1, the inspection subsystem is configured as a light-based inspection subsystem. However, in other embodiments described herein, the inspection subsystem is configured as an electron beam or charged particle beam inspection subsystem. In this manner, in other embodiments, the inspection subsystem is configured for generating the first and second mode test images using electrons.

In general, the inspection subsystems described herein include at least an energy source, a detector, and a scanning subsystem. The energy source is configured to generate energy that is directed to a specimen by the inspection subsystem. The detector is configured to detect energy from the specimen and to generate output responsive to the detected energy. The scanning subsystem is configured to change a position on the specimen to which the energy is directed and from which the energy is detected.

In the light-based inspection subsystems described herein, the energy directed to the specimen includes light, and the energy detected from the specimen includes light. In the embodiment of the system shown in FIG. 1, the inspection subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example in some instances, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art and may be configured to generate light at any suitable wavelength(s) known in the art. In addition, the laser may be configured to generate light that is monochromatic or nearly-monochromatic. In this manner, the laser may be a narrow-band laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF inspection. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection subsystem may be signals or data, but not image signals or image data. In such instances, a computer system such as computer subsystem 36 of the inspection subsystem may be configured to generate images of the specimen from the non-imaging output of the detectors. However, in other instances, the detectors may be configured as imaging detectors that are configured to generate image signals or image data. Therefore, the inspection subsystem may be configured to generate images in a number of ways.

FIG. 1 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing system (e.g., by adding functionality described herein to an existing inspection system) such as the 29xx/39xx series of tools that are commercially available from KLA. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors, including steps described further herein.

The computer subsystem of the inspection subsystem may be further configured as described herein. For example, computer subsystem 36 may be part of the computer system described herein or may be configured as the computer system described herein. In particular, computer subsystem 36 may be configured to perform the steps described herein. As such, the steps described herein may be performed "on-tool," by a computer system or subsystem that is part of an inspection subsystem.

The computer subsystem of the inspection subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system (s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

In an electron beam inspection subsystem, the energy directed to the specimen includes electrons, and the energy detected from the specimen includes electrons. In one such embodiment shown in FIG. 2, the inspection subsystem includes electron column 122, and the system includes computer subsystem 124 coupled to the inspection subsystem. Computer subsystem 124 may be configured as described above. In addition, such an inspection subsystem may be coupled to another one or more computer systems in the same manner described above and shown in FIG. 1.

Figure 2:
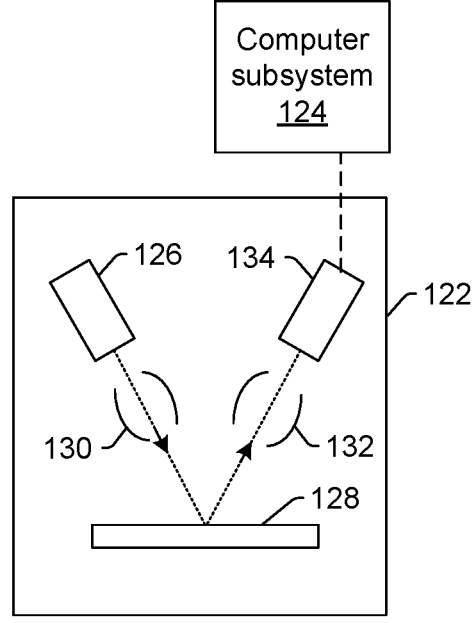

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate images for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform steps described further herein using output generated by detector 134. A system that includes the inspection subsystem shown in FIG. 2 may be further configured as described herein.

FIG. 2 is provided herein to generally illustrate a configuration of an electron beam inspection subsystem that may be included in the embodiments described herein. As with the optical inspection subsystem described above, the electron beam inspection subsystem may be altered to optimize the performance of the inspection subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light or electron beam inspection subsystem, the inspection subsystem may be an ion beam inspection subsystem. Such an inspection subsystem may be configured as shown in FIG. 2 except that the electron beam source may be replaced with any suitable ion beam source known in the art. In addition, the inspection subsystem may include any other suitable ion beam imaging system such as those included in commercially available focused ion beam (FIB) systems, helium ion microscopy (HIM) systems, and secondary ion mass spectroscopy (SIMS) systems.

As further noted above, the inspection subsystem is configured to have multiple modes. In general, a "mode" can be defined by the values of parameters of the inspection subsystem used to generate output such as images for the specimen. Therefore, modes may be different in the values for at least one of the optical or electron beam parameters of the inspection subsystem (other than position on the specimen at which the output is generated). For example, for a light-based inspection subsystem, different modes may use different wavelengths of light and/or different focus offset, polarizer, aperture, optical pixel, stage speed etc. The modes may be different in the wavelengths of light directed to the specimen as described further herein (e.g., by using different light sources, different spectral filters, etc. for different modes). In another embodiment, different modes may use different illumination channels. For example, as noted above, the inspection subsystem may include more than one illumination channel. As such, different illumination channels may be used for different modes.

The multiple modes may also be different in illumination and/or collection/detection. For example, as described further above, the inspection subsystem may include multiple detectors. One of the detectors may be used for one mode and another of the detectors may be used for another mode. The modes may also be different from each other in more than one way described herein (e.g., different modes may have one or more different illumination parameters and one or more different detection parameters). The inspection subsystem may be configured to scan the specimen with different modes in the same scan or different scans, e.g., depending on the capability of using multiple modes to scan the specimen at the same time.

As noted above, the inspection subsystem may be configured for directing energy (e.g., light, electrons) to and/or scanning energy over a physical version of the specimen thereby generating actual images for the physical version of the specimen. In this manner, the inspection subsystem may be configured as an "actual" inspection system, rather than a "virtual" system. However, a storage medium (not shown) and computer subsystem(s) 102 shown in FIG. 1 may be configured as a "virtual" system. In particular, the storage medium and the computer subsystem(s) are not part of inspection subsystem 100 and do not have any capability for handling the physical version of the specimen but may be configured as a virtual inspector that performs inspection-like functions using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, the computer system described herein may be further configured as described in these patents.

As described further above, the inspection subsystem generates first and second mode test images of a specimen with first and second modes, respectively, of the inspection subsystem. The inspection subsystem may be an actual inspection subsystem that generates the first and second mode test images by scanning a physical version of the specimen with at least the first and second modes (M1, M2, . . . , MN). The inspection subsystem may also or alternatively be configured as a virtual inspection subsystem that plays back stored images of the physical version of the specimen that were generated and stored as described above. In either case, the scans may be performed as described further herein.

Figure 3:
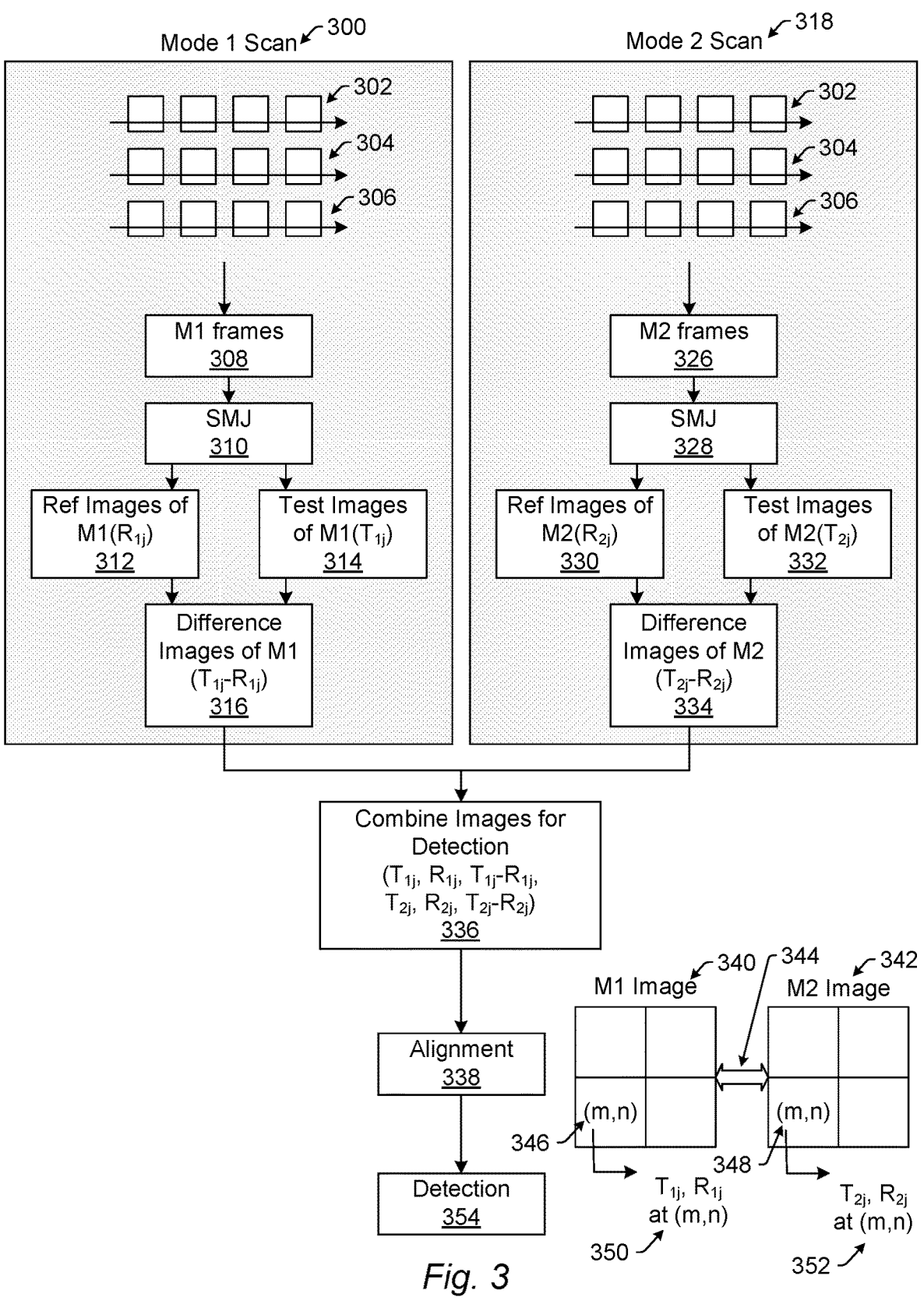
FIGS. 3 and 4 are flow charts illustrating embodiments of steps that may be performed for detecting defects on a specimen.

Although embodiments may be described herein with respect to first and second modes, the embodiments may be used with more than two modes. As shown in FIG. 3, the inspection subsystem may perform mode 1 scan 200 and mode 2 scan 318. The mode 1 scan may include scanning one or more swaths across the specimen. For example, as shown in FIG. 3, mode 1 scan 300 may include scanning swaths across die rows 302, 304, and 306 on a specimen (not shown in FIG. 3). In a similar manner, the mode 2 scan may include scanning corresponding swaths across die rows 302, 304, and 306 on a specimen. The steps described herein may be performed separately and independently for each of the different swaths (or each set of corresponding swaths) to reduce the complexity of the embodiments, and the defect detection results generated for any of the swaths may be combined into a single inspection result for the specimen. Scanning any of the swaths with the first mode may generate M1 frames 308, and scanning any of the swaths with the second mode may generate M2 frames 326.

In general, as used herein, $T_{ij}$=test image for mode i and job j. A job is a collection of frames that may be processed together for functions described herein such as defect detection. Therefore, the configuration of the jobs and the frames may be determined by the configurations of the various hardware elements described herein. A job may also be design location specific, meaning that the frames in any one job are all generated at positions within the design that are intended to have the same patterned features formed therein having the same patterned feature characteristics. In other words, different jobs may be defined for different specific design locations. Depending on the number of frames generated for any one specific design location, however, there may be multiple jobs for a single design location (e.g., when not all of the frames can be processed together due to size). The frames in any one job may also be generated within a single die or multiple dies on the specimen, e.g., depending on how patterns repeat within a die. For example, there may be multiple locations within a die having the same patterned features with the same patterned feature characteristics, and image frames generated at these locations may be grouped into one job. The image frames generated at corresponding locations in one or more other dies may also be grouped into the same job.

Test images generated with the same mode may be aligned to each other, e.g., so that test images generated at the same design location on the specimen can be identified and used collectively for inspection. The computer system may be configured for aligning the test images generated with a single mode to each other by separately aligning the test images to a design for the specimen or another common reference such as an alignment target or mark. This image alignment may be pixel-to-design (PDA)-based alignment. PDA is a way to align images to the design in the design coordinates. After such alignment, the images that share common design coordinates can be identified and processed collectively. In this manner, intra-mode image alignment may take advantage of align-to-design algorithms such as those available from KLA and described in the above-reference patent by Kulkarni to align images generated with a single mode to the design coordinate system. Aligning the test images to the design may also be performed as described in U.S. Pat. No. 9,830,421 issued Nov. 27, 2017 to Bhattacharyya et al. and U.S. Pat. No. 10,698,325 issued Jun. 30, 2020 to Brauer, which are incorporated by reference as if fully set forth herein. The embodiments described herein may be further configured as described in these patents. This step may also be performed as described further herein.

All frame images in one job should have exactly the same patterns, but they may have other variations, e.g., color variations, that can be problematic for defect detection. The computer system may perform a similarity metric job (SMJ) to calculate a similarity value and determine a job that includes the most similar image frames. In another embodiment, the computer system is configured for calculating first and second similarity metrics for the first and second mode test images, respectively, and separating the first and second mode test images into first and second detection jobs based on the first and second similarity metrics, respectively, and generating the first and second mode reference images, subtracting, combining, and detecting described further herein are separately performed for each of two or more of the first and second detection jobs.

In one such example, a scan, e.g., a partial MCATx scan, may be performed, and an SMJ may be performed to determine the optimal reference image for each target image. A "partial MCATx scan" as that term is used herein is defined as one path that is scanned over a specimen with multiple modes. In this manner, the scan is "partial" in that it does not cover the entire specimen that is inspected. The purpose of such a partial scan is to minimize the system overhead such as mode switching and to maximize the throughput by prompt calculation with a relatively minimal data set. In general, SMJ is a job that calculates the similarity between images and determines a group of images that are most similar for the detection job. The detection job then collectively processes the images that have been determined to be most similar to each other.

SMJ may be separately performed for different modes in the same swath. For example, SMJ may be used to determine the best reference image set that has the most similarity to each other. Since the first and second modes can be totally different modes that generate substantially different images, different SMJ may be separately performed for different modes. For example, as shown in FIG. 3, the computer system may perform SMJ 310 for M1 frames 308, and SMJ 328 for M2 frames 326.

In this manner, for one swath of data generated for the specimen, the images in that swath may be separated into more than one job based on image similarity, i.e., the images in job 1 are most similar to each other, the images in job 2 are most similar to each other, and so on. The images in any one job may therefore be mutually exclusive of the images in any other job, meaning that any one image may only be included in one job. The steps described herein may then be performed for each job separately and independently.

The computer system is configured for generating first and second mode reference images from the first and second mode test images, respectively, and subtracting the first and second mode reference images from the first and second mode test images, respectively, to thereby generate first and second mode difference images, respectively. In general, $R_{ij}$=reference image for mode i and job j. For each job of images produced by SMJ, a reference image may be generated from the images in that job. That reference image may only be used to generate difference images for the test images in the same job. Those difference images may be used as described herein for defect detection. The defect detection results produced for each of the jobs may be combined into one single defect detection result for the swath.

In one such example, as shown in FIG. 3, SMJ 310 may identify M1 frames for job j that are output as test images of M1($T_{1j}$) 314. These test images may include all of the test images generated with the first mode that are most similar to each other. By separating the mode 1 images based on similarity, the SMJ step may also separate the mode 1 images based on patterned features formed at the locations at which the images were generated. However, some substantially different patterned features may appear similarly in the test images (e.g., depending on the imaging capability of the inspection subsystem). Therefore, in some instances, SMJ may be performed for only test images generated at substantially the same patterned features in the design for the specimen. For example, prior to SMJ, the computer system may separate the test images based on design to thereby generate different groups of test images that correspond, respectively, to different patterned features in the design. SMJ may be separately performed for each of these groups of test images. In any case, SMJ will separate the test images based on other variations in the test images so that test images that have similar noise (and possibly other) characteristics can be processed together and separately from other test images.

Test images of M1($T_{1j}$) 314 may include all of the mode 1 test images for job j identified by SMJ, and one or more of these test images may be used to generate reference images of M1($R_{1j}$) 312. Reference images 312 may be generated from test images 314 in any suitable manner. For example, singular value decomposition (SVD) is one method that can be used to generate reference images for the embodiments described herein. Another method that can be used to generate reference images is a linear combination of test images such as might be performed by the MCAT algorithm that is used by some inspection tools commercially available from KLA. Difference images of M1 ($T_{1j}$–$R_{1j}$) 316 may then be generated by subtracting reference images 312 from test images 314. This subtraction may be performed in any suitable manner known in the art.

In a similar manner, test images of M2($T_{2j}$) 332 may include all of the test images for job j identified by SMJ 328, and one or more of these test images may be used to generate reference images of M2($R_{2j}$) 330. Reference images 330 may be generated from test images 332 in any suitable manner such as SVD or a linear combination. In addition, the method used by the computer system to generate reference images 312 and 330 may be the same or different. Difference images of M2 ($T_{2j}$–$R_{2j}$) 334 may be generated by subtracting reference images 330 from test images 332. This subtraction may be performed in any suitable manner known in the art. Generating the reference images and difference images as described above may also be performed for any other jobs, which may be predetermined in the inspection recipe and/or determined by SMJ.

In one such embodiment, generating the first and second mode reference images performed for at least one of the first and second detection jobs comprises selecting one or more of the first and second mode test images for generating the first and second mode reference images, respectively, independently of positions on the specimen at which the first and second test mode images were generated. In other words, the images used for reference image generation may be selected independently from their spatial relationship to the test images. For example, rather than using only images adjacent to the test images as reference images, the images from anywhere in the swath may be selected for reference image generation. By relaxing the spatial constraints on which images can be used as reference images, the embodiments described herein can generate better reference images (i.e., reference images that have fewer non-defect differences from the test images) that can enable more sensitive inspection (e.g., detecting more DOI and/or smaller defects). In other words, the embodiments described herein can generate better references and thereby better sensitivity because the references are generated from images selected based on a similarity-based metric rather than proximity-based images.

The multimode detection embodiments described herein may be different in this aspect from currently used multimode detection systems and methods. For example, the primary detection step of the embodiments described herein may utilize an advanced method for computing an optimal reference image. Some examples of such methods are described in U.S. Patent Application Publication No. 2021/0090229 to Brauer et al. published Mar. 25, 2021, which is incorporated by reference as if fully set forth herein. The embodiments described herein may be further configured as described in this publication. The MCATx detection paradigm described herein may or may not use the same optimal reference images between scans when difference images are used for processing.

The computer system is further configured for combining the first and second mode test images, the first and second mode reference images, and the first and second mode difference images as an input for defect detection and detecting defects on the specimen based on at least the first and second mode difference images in the input. For example, the images generated with the first and second modes (raw T, R, and difference images, T–R) may be combined to perform final defect detection at locations that were scanned with the first and second modes. As shown in FIG. 3, for example, the computer subsystem may combine images for detection $(T_{1j}, R_{1j}, T_{1j}–R_{1j}, T_{2j}, R_{2j}, T_{2j}–R_{2j})$ in step 336. Defect detection step 354 may be performed based on at least the difference images in the combined images. The key is to utilize the data from two modes, either a) each reference/test image set, b) each difference image set, or both a) and b) together. The images that are used for defect detection and the defect detection method used may vary depending on the actual input data. The defect detection method may also vary depending on the defect type(s), e.g., as described further herein, different defect types may be more or less detectable using different defect detection methods.

The test images generated with the different modes may be aligned to each other so that test images generated at the same design location on the specimen can be used collectively for inspection. In one embodiment, the computer system is configured for aligning the first and second mode test images to each other by separately aligning the first and second mode test images to a design for the specimen. As shown in FIG. 3, the computer system may perform alignment in step 338. In particular, alignment step 338 may include performing alignment 344 of M1 image 340 to M2 image 342 so that image pixel(m,n) 346 in the first mode image is aligned to corresponding image pixel(m,n) 348 in the second mode image. In this manner, images $T_{1j}, R_{1j}$ at (m,n) 350 may be aligned to images $T_{2j}, R_{2j}$ at (m,n) 352 in the second mode image. As such, when the image data set from multiple modes are fully aligned, e.g., as shown in FIG. 3, at each image pixel(m,n), image information $(T_{1j}, R_{1j}, T_{2j}, R_{2j})$ and variations such as $T_{1j}–R_{1j}$ and $T_{2j}–R_{2j}$ are available for use in the defect detection step. Any or all of this information can be directly used in the detection step.

Inter-mode alignment can be one of the challenges when two different mode images are simultaneously or collectively processed. The inter-mode image alignment performed by the embodiments described herein may be PDA-based alignment, which may be performed as described further herein. Although images from two modes are different, the images share common design coordinates once each image is aligned to the design through PDA. In this manner, inter-mode image alignment may take advantage of align-to-design algorithms such as those described above to align images of multiple modes to the design coordinate system. Aligning the first and second mode images to the design may also be performed as described in U.S. Pat. No. 9,830,421 to Bhattacharyya et al. issued Nov. 27, 2017, U.S. Pat. No. 10,698,325 to Brauer issued Jun. 30, 2020, and U.S. Pat. No. 11,580,650 to Brauer et al. issued Feb. 14, 2023, which are incorporated by reference as if fully set forth herein. The embodiments described herein may be further configured as described in these patents.

Figure 4:
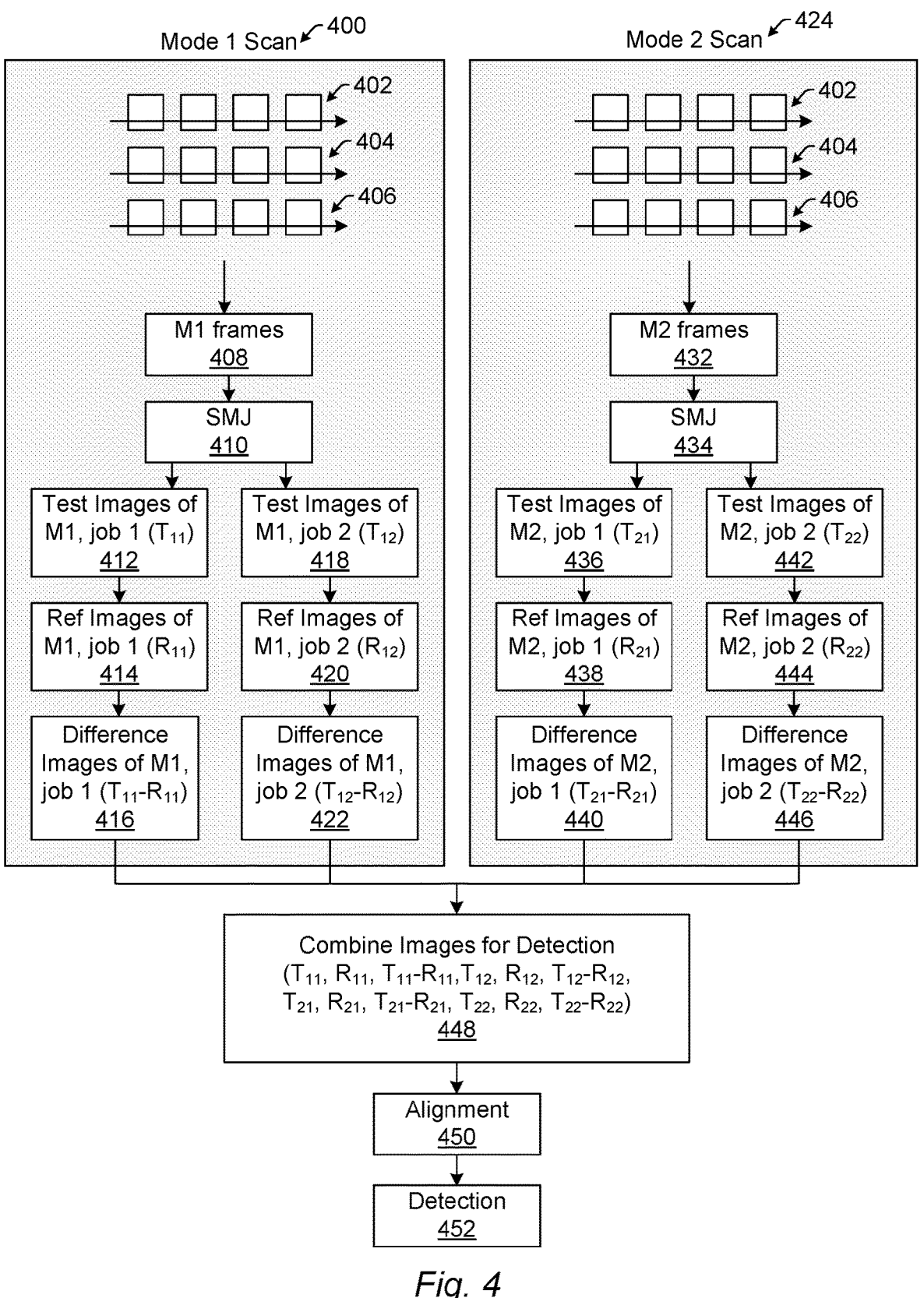

As described above and shown in FIG. 3, the steps may be performed for job j and multiple modes. The same steps may be performed for other jobs (e.g., jobs 1, . . . , j), either in the inspection recipe or determined by SMJ. In this manner, the steps may be separately performed for each job. FIG. 4 further shows how the steps may be performed for multiple jobs. The steps for each of the jobs shown in this figure may be performed sequentially or simultaneously. In addition, although FIG. 4 shows the steps being performed for two jobs, the same steps may be performed for any number of jobs sequentially or simultaneously.

As shown in FIG. 4, the inspection subsystem may perform mode 1 scan 400 and mode 2 scan 424, both of which may be performed as described herein. Mode 1 scan 400 may include, for example, scanning a swath across die rows 402, 404, and 406 on a specimen (not shown in FIG. 4) to thereby generate M1 frames 408, and mode 2 scan 424 may include scanning a swath across die rows 402, 404, and 406 on the specimen to thereby generate M2 frames 432. SMJ step 410 may be performed on the M1 frames, and SMJ step 434 may be performed on the M2 frames. SMJ step 410 may separate the M1 frames into two jobs, test images of M1, job 1 $(T_{11})$ 412 and test images of M1, job 2 $(T_{12})$ 418. SMJ step 434 may separate the M2 frames into two corresponding jobs, test images of M2, job 1 $(T_{21})$ 436 and test images of M2, job 2 $(T_{22})$ 442. Different reference images may then be generated for each job of test images for each mode. For example, the computer system may generate reference images of M1, job 1 $(R_{11})$ 414 for test images $T_{11}$, reference images of M1, job 2 $(R_{12})$ 420 for test images $T_{12}$, reference images of M2, job 1 $(R_{21})$ 438 for test images $T_{21}$, and reference images of M2, job 2 $(R_{22})$ 444 for test images $T_{22}$. Each of these reference images may be generated as described further herein.

The computer system also generates difference images for each set of reference and test images. For example, the computer system may generate difference images of M1, job 1 $(T_{11}–R_{11})$ 416, difference images of M1, job 2 $(T_{12}–R_{12})$ 422, difference images of M2, job 1 $(T_{21}–R_{21})$ 440, and difference images of M2, job 2 $(T_{22}–R_{22})$ 446. Each of these difference images may be generated as described further herein. The computer system may then combine images for defect detection, as shown in step 448, and the combined images may include any of the test, reference, and difference images generated as described above. In some instances, the computer system may perform image alignment 450 to align the images from one mode to the images from another mode, which may be performed as described further herein. In addition, the computer system may perform defect detection in step 452 using any of the images in the combined input. Defect detection may be performed in step 452 as described further herein.

The detection step is one of the new aspects of the multimode detection described herein. In particular, the information processed from the modes is not limited to attributes. Instead, the input to the defect detection contains the difference imagery for each detected defect so that more advanced algorithms such as, but not limited to, difference image cross correlation may be used to combine the two modes' images and better filter out or retain the defects. Use of raw imagery in defect detection also allows for additional new attribute calculations that are not possible with just the individual scan results. In this manner, the defect detection described herein may be a kind of multimode fusion detection in which the computer system fuses data using MCATx swathing images between modes.

Defect detection using the combined input may be performed in one of a variety of different ways such as MDAT or a nonlinear detector like machine learning (ML) or deep learning (DL), and one-dimensional (1D) or two-dimensional (2D) model-based detectors such as 1D or 2D cloud detection. In addition, the defect detection step may include combining difference images using cross correlation or HLAT-like fusion. MDAT and HLAT are defect detection algorithms that are used by some inspection tools commercially available from KLA. Some examples of MDAT are also described, for example, in U.S. Pat. No. 10,923,317 to Huang et al. issued Feb. 16, 2021, which is incorporated by reference as if fully set forth herein. The embodiments described herein may be further configured as described in this patent.

The detecting step may include a fusion cloud approach, which is based on a noise cloud. The noise cloud may be a distribution of difference image values (like T–R). Defect detection is performed to find outliers in the distribution of difference values (or noise cloud). Currently, inspection uses only one noise distribution from one optical mode. Even in currently used multimode detection, the detection may be based on noise distribution in the primary optical mode, and nuisance suppression is based on image attributes calculated at the same location of the image from the secondary optical mode. In contrast, the embodiments described herein may perform a noise cloud approach that is based on two inspection tool modes simultaneously.

In some embodiments, the detecting step includes a 1D noise cloud detection method. The detecting step may therefore include a multimode 1D detection. A 1D noise cloud method (or a "1st order cloud approach") may generate scalar values from two difference images. In one such example, a 1D noise cloud method may include converting two noise clouds to one normalized scalar value such as $$\frac{|T_{11} - R_{11}| \cdot |T_{21} - R_{21}|}{\sigma_1^2 \sigma_2^2},$$

where $\sigma$ is estimated from (Tij–Rij), and detecting outliers. If more than one reference is generated for any one test image, e.g., as might be done in double detection, then the 1D noise cloud approach may also be used for the second detection with the second reference image(s) in the same way. In addition, such a 1D noise cloud approach may be separately performed for each job of images, which may be generated for example based on similarity of images in a swath to each other.

In another embodiment, the detecting step includes a 2D noise cloud detection method. The detecting step may therefore include a multimode 2D cloud detection method. A 2D noise cloud method generates hybrid values from the two difference images. For example, a 2D noise cloud method may include performing a modal difference cross correlation such as $|T_{11}–R_{11}| \odot |T_{21}–R_{21}|$ and detecting outliers. The 2D noise cloud method may include, for example, mapping two individual noise distributions into the 2D distribution map and detecting outliers. If more than one reference is generated for any one test image, e.g., as might be done in double detection, then the 2D noise cloud approach may also be used for the second detection with the second reference image(s) in the same way. In addition, such a 2D noise cloud approach may be separately performed for each job of images, which may be generated for example based on similarity of images in a swath to each other.

The embodiments may generate noise clouds having more than two dimensions as well. For example, 2D noise cloud methods may work for some defect types, but other defect types may need more complicated, higher dimensional nonlinear maps. For such defect types, a three-dimensional (3D) noise cloud may be used for defect detection if it is not too sparse. One such noise cloud may be generated by having $|T_{11}–R_{11}|$ plotted on the x axis, $|T_{21}–R_{21}|$ plotted on the y axis, and R plotted on the z axis. In this manner, a 3D noise cloud approach may be a kind of extension of a 2D distribution map to one scalar value (Z-direction). A higher dimension extends the problem domain, sometimes allowing determination of a linear plane that separates two data sets. For example, two data sets at X and Y coordinates each have their own distribution, respectively. Those individual distributions can be mapped at 2D based on the common coordinates. With a 2D map, a threshold can be determined and used to find outliers. However, some defects may be inside the 2D cloud and therefore undetectable by the threshold. In this case, a hyper-dimension (for example, 3D) may help the separation, but can run into data sparsity (or insufficiency) issues that can cause over-fitting.

In a further embodiment, the detecting step includes DL based defect detection. In some such instances, ML or DL can be specialized to extend feature dimensions and to manage the overfitting issue described above that can be experienced with higher dimension noise cloud approaches. Some examples of defect classifiers that may also perform defect detection and are ML based are described in U.S. Pat. No. 10,607,119 issued Mar. 31, 2020 to He et al., which is incorporated by reference as if fully set forth herein. Some examples of ML based defect detectors are described in U.S. Pat. No. 10,186,026 issued Jan. 22, 2019 to Karsenti et al., U.S. Pat. No. 10,599,951 issued Mar. 24, 2020 to Bhaskar et al., U.S. Pat. No. 10,713,769 issued Jul. 14, 2020 to Zhang et al., and U.S. Pat. No. 11,551,348 issued Jan. 10, 2023 to Zhang et al., which are incorporated by reference as if fully set forth herein. The embodiments described herein may be further configured as described in these references.

The detecting step may also be performed as described in U.S. patent application Ser. No. 18/128,125 by Virk et al. filed Mar. 29, 2023, which is incorporated by reference as if fully set forth herein. The embodiments described herein may be further configured as described in this patent application.

In one embodiment, the inspection subsystem is configured for generating the first and second mode test images by scanning a swath across a die row on the specimen with the first and second modes, respectively, the swath has a length equal to or greater than a width of the die row, and the computer system is configured for performing the generating the first and second mode reference images, subtracting, combining, and detecting steps using only the first and second mode test images generated by the scanning. In this manner, one swath across a die row on a specimen may be scanned with the first and second modes, either sequentially or simultaneously. The entire width of the die row on the specimen may be scanned with the two modes, although that is not necessary. In addition, the swath may or may not cover the entire height of the die row, and multiple swaths may be scanned over a die row with the same mode as described herein. After the entire die row has been scanned with both modes, the steps described herein may be performed (although some of the steps may be performed after only the first mode scan has been performed). In this manner, the steps described herein may be performed separately and independently for each die row swath scanned on the specimen. If more than two swaths are inspected on a specimen with the embodiments described herein, the inspection results generated for the specimen may include all of the defects detected in all of the swaths, for example, by simply combining the results for different swaths. However, more sophisticated ways of combining the detection results for multiple swaths may be used and/or additional steps, e.g., detecting systematic defects, determining spatial distribution characteristics of defects, etc., may be performed using the inspection results for multiple swaths.

The above described embodiments may be particularly useful when multiple mode data is only sequentially available. In such instances, the embodiments may hold one mode data in persistent storage (like a hard disk) or temporary storage (like memory) until the second mode data is available. The more data that is stored, the higher the data rate and the greater the storage space that are needed. In addition, since it takes physical time to change an inspection tool mode, it is advantageous to minimize the frequency of mode changes.

The swathing and data processing strategy described above, which may also be referred to herein as an MCATx swathing strategy, can overcome or at least minimize many of the issues identified above. The swathing strategy is unique to scanning the same swath areas at the die row over the entire specimen, which is also referred to as "one path." The swathing strategy holds the entire swath information of the one path. Such a swathing and data processing strategy can also provide much higher sensitivity than other methods because so much of the data can be retained and processed collectively, which may be performed as described further herein. Although such a swathing and data processing strategy provides advantages for single mode inspection processes, the embodiments described herein provide additional advantages such as enhanced detection sensitivity when such a swathing and data processing strategy is used with multiple mode information.

In some embodiments, the detecting step does not include determining first mode attributes of first mode candidate defects from only one or more of the first mode test, reference, and difference images or determining second mode attributes of second mode candidate defects from only one or more of the second mode test, reference, and difference images. In other words, the embodiments described herein do not determine separate attributes from images generated for or with different modes of an inspection subsystem, e.g., first defect attributes from first mode images, second defect attributes from second mode images, etc., and then use the attributes, e.g., with a rules based method, to determine if the defects are reported or filtered as nuisances. In addition, the embodiments described herein do not use the results of two independent detection scans from different modes to apply rules to the attributes of common defects to filter or retain them. Instead, the embodiments described herein collectively utilize the images themselves from different modes for defect detection, which can be beneficial in a number of ways described further herein.

In another embodiment, the detecting step includes determining an attribute of a candidate defect based on at least one of the first mode test, reference, and difference images in combination with at least one of the second mode test, reference, and difference images. In this manner, the embodiments described herein enable defect attributes to be determined from multimode images. For example, determining an attribute of a candidate defect may include determining an attribute of a candidate defect as a function of the first and second difference images. In this manner, the computer system may calculate multimode image-based attributes. The defect attributes that are determined from the multimode images may include any defect attributes known in the art such as defect size, defect shape, defect roughness, defect orientation, and the like. In addition, since the defect attributes may be determined based on at least one image generated with a first mode and at least one image generated with a second mode, the defect attributes may be more accurate than if the defect attribute is determined separately from different mode images. The embodiments described herein also make possible multimode defect attributes, or defect attributes that cannot be determined from images generated with a single mode. In other words, the embodiments described herein may provide new ways to describe attributes of a defect using images generated with more than one mode.

The embodiments described herein may then use the multimode defect attributes for defect detection, and these defect attributes may be used in the same manner as other defect attributes for defect detection. For example, defect detection may include applying a threshold to the multimode defect attributes and identifying only image portions having a multimode defect attribute above the threshold as defects. In another example, the defect detection may include applying one or more rules to the multimode defect attributes to detect defects in the images. In this manner, the multimode defect attributes may be determined for image portions that are not known to be defects and the attributes may then be used for defect detection. However, such multimode defect attributes may also or alternatively be used subsequent to defect detection for functions such as nuisance filtering, defect classification, etc. In one such embodiment, the computer system is configured for determining an attribute of at least one of the detected defects based on at least one of the first mode test, reference, and difference images in combination with at least one of the second mode test, reference, and difference images. In this manner, the multimode defect attributes may be used in a post-defect detection manner. In such instances, the defects may be detected in any suitable manner described herein, and then for any potential defects, the multimode defect attributes may be determined and used for one or more functions described above.

In a further embodiment, the computer system is configured for detecting first mode candidate defects on the specimen based on the first mode difference images, and generating the second mode reference images, subtracting the second mode reference images from the second mode test images, the combining step, and the detecting step are performed for only locations of the first mode candidate defects. In this manner, the computer system may determine candidates for events that are potential DOIs. For example, an analogous MCATx detection scan may be performed using a second mode and the locations provided by the first mode. In other words, the first mode may be used to scan the specimen in a first swath, and defect detection may be performed as described herein using only the images generated in that scan. The same swath may then be scanned using the second mode to obtain target and reference image candidates using the second mode at the locations provided by the first mode defect detection. The inspection performed using the second mode images may then be performed as described further herein. In some instances, the reference images generated using the first mode may also be used for the second mode. Whether the same references are used for both modes may depend on how similar the images generated by the first and second modes are. The first and second mode imagery (either raw T, R, or difference images, T-R) are then combined to perform final defect detection at each candidate location.

The embodiments described herein may therefore coordinate scanning and data processing in a couple of different ways when the system alternates between modes used to scan the specimen (meaning that the modes are used sequentially to scan the specimen). In one way, the entire area is scanned with both modes and then the data processing commences after the scanning is completed. In this manner, each location that is scanned can be examined with both modes. In other words, defect detection would happen only when the first and second mode data sets are all available. This method is relatively simple when both modes can be used to simultaneously scan the specimen but becomes more complicated when the system sequentially alternates between the modes used for scanning. For example, this method may be advantageous except if it causes an issue on the data storage and data rate that preferably writes/reads the whole data without delaying any scan. More specifically, the goal of some currently used inspection methods is to finish the inspection when the scan is completed, meaning that the defect detection is almost in real-time with the scanning. Current inspection scanning data rates may be tens of GB/s, which can require significant storage technology or cost to catch up to the speed. To mitigate this from a system perspective, the embodiments may perform defect detection with the test images as they become available, even if not all of the mode images are available yet. In this manner, since one path data may be completely independent of other paths, detection may immediately start when one path of the two modes is completed.

In this manner, the scanning strategy used by the embodiments described herein may include revisiting potential candidate defects detected with one mode to scan them with another mode. However, the mode scanning strategy used by the embodiments described herein may also include independent scanning with the modes, meaning that the area on the specimen that is scanned with one mode is independent of any results generated with another mode. For example, the inspection subsystem described herein may be configured for scanning an entire swath on the specimen with both modes and then collectively processing the data after the scanning of the swath has been completed.

The inspection subsystem may be alternated between the two modes until the full specimen area is inspected. The specimen area of each mode's partial scan is a tradeoff between memory and hardware performance as the mode change requires significant overhead in switching time. The mode switching impact on the inspection subsystem hardware may also be considered.

In one such embodiment, detecting the first mode candidate defects includes applying a hot threshold to the first mode difference images. A "hot" threshold as that term is used herein is generally defined as a threshold that is set at, near, or even within the noise floor of the images generated by the inspection subsystem. For example, the computer system may detect the first mode candidate defects with a substantially low threshold that may be set at the noise floor. In this manner, the first mode candidate defects may include a substantial amount of nuisance, but that can be filtered out using the second mode images. In addition, using such a low threshold to detect the candidate defects with the first mode increases the chances that all defect candidates on the specimen will be detected with the first mode even if not all of the defect candidates would be detected with a normal threshold. In other words, using such a low threshold reduces the chances that defect candidates will be missed by the first mode image processing and therefore not considered when performing the second mode image processing. Applying the hot threshold may be performed in any suitable manner, e.g., identifying only image portions above the hot threshold as defect candidates.

In one embodiment, at least one of the defects is only detectable in the first or second mode. For example, some defect types are sensitive to the optical mode, and so there may be extremely weak or no signal with the specific optical mode for defects in one mode but not another. This embodiment is therefore unlike some currently used multimode inspection processes in which defect candidates are separately detected in two or more modes and then defects that are common to the two or more modes are identified as actual defects. Instead, by considering multimode images together for defect detection, e.g., based on one of the noise cloud methods described herein, defects that are detectable with only one mode may be detected. Therefore, the embodiments described herein may advantageously increase the probability that all defects on a specimen are detected by inspection.

In an additional embodiment, the computer system is configured for performing single mode defect detection for the specimen based on only the first or second test images and for generating inspection results for the specimen based on results of the single mode defect detection and the detecting step. For example, the embodiments described herein may contain additional processing channels that keep existing single mode detection for one or both modes. In this manner, single mode detection may be performed with the first mode, single mode detection may also or alternatively be performed with the second mode, and so on. The results of the single mode defect detection(s) and the multimode defect detection described herein may be combined in any suitable manner into a single inspection result for the specimen.

In some embodiments, the computer system is configured for performing an additional multimode defect detection for the specimen based on first and second mode attributes determined for defect candidates from the first and second test modes, respectively, and for generating inspection results for the specimen based on results of the additional multimode defect detection and the detecting step. For example, the embodiments described herein may contain additional processing channels that keep currently used or other multimode processing methods such as those described further above. The results of the different multimode defect detections may be combined in any suitable manner into a single inspection result for the specimen.

Any of the computer systems described herein may generate inspection results, which may include the results of any of the steps described herein. The inspection results may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer system in any suitable manner. The results for the defects may have any suitable form or format such as a standard file type. The computer system may generate the results and store the results such that the results can be used by the computer system and/or another system or method to perform one or more functions for the specimen or another specimen of the same type.

The computer system may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the inspection on the specimen may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer system may be configured to determine one or more changes to a process that was or will be performed on a specimen inspected as described herein based on the detected defect(s). The changes to the process may include any suitable changes to one or more parameters of the process. The computer system preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer system may determine such changes in any suitable manner known in the art.

Those changes can then be sent to a semiconductor fabrication system (not shown) or a storage medium (not shown) accessible to the computer system and the semiconductor fabrication system. The semiconductor fabrication system may or may not be part of the system embodiments described herein. For example, the computer system and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of the system described above may be combined together into one single embodiment. In other words, unless otherwise noted herein, none of the system embodiments are mutually exclusive of any other system embodiments.

The embodiments described herein have a number of important advantages over other multimode inspection methods and systems. For example, the embodiments described herein provide improved multimode defect detection by combining raw imagery between modes. The embodiments described herein also provide improved multimode defect detection performance by use of MCATx swathing in each mode to compute optimal reference images in each mode. The embodiments described herein also provide improved defect detection performance on currently used inspection tools which can directly result in additional entitlement using existing inspection tool hardware.

The improvements and advantages provided by the embodiments described herein are enabled by a number of new features including, but not limited to, the use of MCATx in multimode inspection and multimode MCATX image fusion for detection.

Another embodiment relates to a method for detecting defects on a specimen. The method includes acquiring first and second mode test images of a specimen generated with first and second modes, respectively, of an inspection subsystem. Acquiring the images may be performed using an inspection subsystem described herein (e.g., by directing light or an electron beam to the specimen and detecting light or an electron beam, respectively, from the specimen). In this manner, acquiring the images may be performed using the physical specimen itself and some sort of imaging hardware. However, acquiring the images does not necessarily include imaging the specimen using imaging hardware. For example, another system and/or method may generate the images and may store the generated images in one or more storage media such as a virtual inspection system as described herein or another storage medium described herein. Therefore, acquiring the images may include acquiring the images from the storage media in which they have been stored.

The method also includes generating first and second mode reference images, subtracting reference images from test images on a mode-to-mode basis, combining multimode images as an input for defect detection, and detecting defects steps described above. The steps are performed by a computer system, which may be configured according to any of the embodiments described herein.

Each of the steps of the method may be performed as described further herein. The method may also include any other step(s) that can be performed by the inspection subsystem and/or computer system described herein. In addition, the method described above may be performed by any of the system embodiments described herein.

Figure 5:
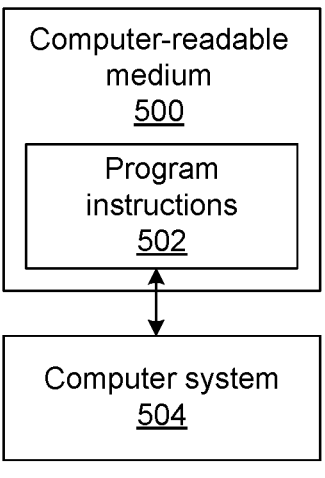
FIG. 5 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 5. In particular, as shown in FIG. 5, non-transitory computer-readable medium 500 includes program instructions 502 executable on computer system 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), GPU programming packages (such as Tensorflow, CUDA, etc.), or other technologies or methodologies, as desired.

Computer system 504 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for detecting defects on a specimen, comprising:
   an inspection subsystem configured for generating first and second mode test images of a specimen with first and second modes, respectively, of the inspection subsystem; and
   a computer system configured for:
   calculating first and second similarity metrics for the first and second mode test images, respectively;
   separating the first and second mode test images into first and second detection jobs based on the first and second similarity metrics, respectively;
   generating first and second mode reference images from the first and second mode test images, respectively;
   subtracting the first and second mode reference images from the first and second mode test images, respectively, to thereby generate first and second mode difference images, respectively;
   combining the first and second mode test images, the first and second mode reference images, and the first and second mode difference images as an input for defect detection; and
   detecting defects on the specimen based on at least the first and second mode difference images in the input, wherein said generating the first and second mode reference images, subtracting, combining, and detecting are separately performed for each of two or more of the first and second detection jobs.

2. The system of claim 1, wherein the computer system is further configured for aligning the first and second mode test images to each other by separately aligning the first and second mode test images to a design for the specimen.

3. The system of claim 1, wherein the inspection subsystem is further configured for generating the first and second mode test images by scanning a swath across a die row on the specimen with the first and second modes, respectively, wherein the swath has a length equal to or greater than a width of the die row, and wherein the computer system is further configured for performing said generating the first and second mode reference images, subtracting, combining, and detecting using only the first and second mode test images generated by the scanning.

4. The system of claim 1, wherein said generating the first and second mode reference images performed for at least one of the first and second detection jobs comprises selecting one or more of the first and second mode test images for said generating the first and second mode reference images, respectively, independently of positions on the specimen at which the first and second test mode images were generated.

5. The system of claim 1, wherein said detecting does not comprise determining first mode attributes of first mode candidate defects from only one or more of the first mode test, reference, and difference images or determining second mode attributes of second mode candidate defects from only one or more of the second mode test, reference, and difference images.

6. The system of claim 1, wherein said detecting comprises determining an attribute of a candidate defect based on at least one of the first mode test, reference, and difference images in combination with at least one of the second mode test, reference, and difference images.

7. The system of claim 1, wherein the computer system is further configured for determining an attribute of at least one of the detected defects based on at least one of the first mode test, reference, and difference images in combination with at least one of the second mode test, reference, and difference images.

8. The system of claim 1, wherein the computer system is further configured for detecting first mode candidate defects on the specimen based on the first mode difference images, and wherein said generating the second mode reference images, said subtracting the second mode reference images from the second mode test images, said combining, and said detecting are performed for only locations of the first mode candidate defects.

9. The system of claim 8, wherein detecting the first mode candidate defects comprises applying a hot threshold to the first mode difference images.

10. The system of claim 1, wherein at least one of the defects is only detectable in the first or second mode.

11. The system of claim 1, wherein said detecting comprises a one-dimensional noise cloud detection method.

12. The system of claim 1, wherein said detecting comprises a two-dimensional noise cloud detection method.

13. The system of claim 1, wherein said detecting comprises deep learning based defect detection.

14. The system of claim 1, wherein the computer system is further configured for performing single mode defect detection for the specimen based on only the first or second test images and for generating inspection results for the specimen based on results of the single mode defect detection and said detecting.

15. The system of claim 1, wherein the computer system is further configured for performing an additional multimode defect detection for the specimen based on first and second mode attributes determined for defect candidates from the first and second test images, respectively, and for generating inspection results for the specimen based on results of the additional multimode defect detection and said detecting.

16. The system of claim 1, wherein the inspection subsystem is further configured for generating the first and second mode test images using light.

17. The system of claim 1, wherein the inspection subsystem is further configured for generating the first and second mode test images using electrons.

18. A non-transitory computer-readable medium, storing program instructions executable on a computer system for performing a computer-implemented method for detecting defects on a specimen, wherein the computer-implemented method comprises:

acquiring first and second mode test images of a specimen generated with first and second modes, respectively, of an inspection subsystem;

calculating first and second similarity metrics for the first and second mode test images, respectively;

separating the first and second mode test images into first and second detection jobs based on the first and second similarity metrics, respectively;

generating first and second mode reference images from the first and second mode test images, respectively;

subtracting the first and second mode reference images from the first and second mode test images, respectively, to thereby generate first and second mode difference images, respectively;

combining the first and second mode test images, the first and second mode reference images, and the first and second mode difference images as an input for defect detection; and detecting defects on the specimen based on at least the first and second mode difference images, wherein said calculating, separating, generating, subtracting, combining, and detecting are performed by the computer system, and wherein said generating the first and second mode reference images, subtracting, combining, and detecting are separately performed for each of two or more of the first and second detection jobs.

19. A computer-implemented method for detecting defects on a specimen, comprising:

acquiring first and second mode test images of a specimen generated with first and second modes, respectively, of an inspection subsystem;

calculating first and second similarity metrics for the first and second mode test images, respectively;

separating the first and second mode test images into first and second detection jobs based on the first and second similarity metrics, respectively;

generating first and second mode reference images from the first and second mode test images, respectively;

subtracting the first and second mode reference images from the first and second mode test images, respectively, to thereby generate first and second mode difference images, respectively;

combining the first and second mode test images, the first and second mode reference images, and the first and second mode difference images as an input for defect detection; and detecting defects on the specimen based on at least the first and second mode difference images, wherein said calculating, separating, generating, subtracting, combining, and detecting are performed by a computer system, and wherein said generating the first and second mode reference images, subtracting, combining, and detecting are separately performed for each of two or more of the first and second detection jobs.

* * * * *